United States Patent
Kitahara

(10) Patent No.: US 10,539,446 B2
(45) Date of Patent: Jan. 21, 2020

(54) METHOD FOR ADJUSTING FLOW MEASURING DEVICE

(75) Inventor: Noboru Kitahara, Kariya (JP)

(73) Assignee: DENSO CORPORATION, Kariya (JP)

(*) Notice: Subject to any disclaimer, the term of this patent is extended or adjusted under 35 U.S.C. 154(b) by 1010 days.

(21) Appl. No.: 13/473,967

(22) Filed: May 17, 2012

(65) Prior Publication Data

US 2012/0291519 A1 Nov. 22, 2012

(30) Foreign Application Priority Data

May 19, 2011 (JP) .................................. 2011-112036

(51) Int. Cl.
*G01F 5/00* (2006.01)
*G01F 1/72* (2006.01)

(52) U.S. Cl.
CPC . *G01F 5/00* (2013.01); *G01F 1/72* (2013.01)

(58) Field of Classification Search
CPC ............... G01F 25/007; G01F 25/0015; G01F 25/0023; G01F 25/003; G01F 25/0038; G01F 25/0046; G01F 25/0053; G01F 5/00; G01F 1/72
USPC .......................................................... 73/1.16
See application file for complete search history.

(56) References Cited

U.S. PATENT DOCUMENTS

| | | | | |
|---|---|---|---|---|
| 5,668,313 A * | 9/1997 | Hecht | ..................... | G01F 1/684 73/114.32 |
| 5,681,989 A * | 10/1997 | Kanke | .................. | F02D 41/187 73/114.34 |
| 6,851,311 B2 * | 2/2005 | Nakada | ................. | F02D 41/187 73/202.5 |

OTHER PUBLICATIONS

"Motoring with Microprocessors" Jim Turley https://www.embedded.com/electronics-blogs/significant-bits/4024611/Motoring-with-microprocessors#,published Aug. 11, 2003, retrieved Nov. 7, 2017.*
Office Action (1 page) dated Apr. 9, 2013, issued in corresponding Japanese Application No. 2011-112036 and English translation (2 pages).

* cited by examiner

*Primary Examiner* — Nathaniel J Kolb
(74) *Attorney, Agent, or Firm* — Nixon & Vanderhye PC

(57) ABSTRACT

A method is for adjusting a flow measuring device that includes a housing and a flow sensor. The housing includes a bypass flow passage which is formed to take in a part of a mainstream of air. The sensor is disposed in the bypass flow passage and outputs an electrical signal in accordance with a flow rate of air. The bypass flow passage is formed in an asymmetrical shape with respect to the sensor in upstream and downstream directions of the mainstream. A flow from an upstream side toward a downstream side of the mainstream is a forward flow. A flow from the downstream side toward the upstream side of the mainstream is a backward flow. According to the method, an output from the sensor in a backward-flow region is obtained. Furthermore, the output of the sensor in the backward-flow region is adjusted to have a desired output characteristic.

12 Claims, 7 Drawing Sheets

MAINSTREAM →

BACKWARD FLOW

METHOD FOR ADJUSTING FLOW MEASURING DEVICE

CROSS REFERENCE TO RELATED APPLICATION

This application is based on Japanese Patent Application No. 2011-112036 filed on May 19, 2011, the disclosure of which is incorporated herein by reference.

TECHNICAL FIELD

The present disclosure relates to a method for adjusting a flow measuring device including a housing that has a bypass flow passage which takes in a part of a mainstream, and a flow sensor that is disposed in the bypass flow passage and outputs an electrical signal in accordance with a flow rate of air.

BACKGROUND

A flow measuring device outputs from a flow sensor an electrical signal in accordance with a flow rate. The outputted electrical signal is then converted into the flow rate through a predetermined conversion map. For example, an electronic control unit (ECU) connected to the flow measuring device includes a storage means for storing the conversion map, and a calculation means for converting the electrical signal into the flow rate based on the conversion map.

A variation exists for each product in output characteristics from the flow sensor. For this reason, for example, before shipment of the product or before attachment of the sensor to an air intake duct, the output characteristic needs to be adjusted to a desired output characteristic that is necessary to convert through a predetermined conversion map.

Conventionally, a technology of adjusting the variation for each product in the output characteristics with respect to a forward flow (flow from the upstream side toward downstream side in a mainstream) is implemented. However, a variation for each product in the output characteristics with respect to a backward flow has not been considered. Accordingly, as illustrated in FIG. 10, the output characteristic varies between products in a backflow region, and these output characteristics are converted through a common conversion map, which results in low accuracy.

Technologies which can detect a flow rate of the backflow region and corrects a conversion map when converting an output in the backflow region are described in Japanese Patent No. 3583136 (corresponding to U.S. Pat. No. 5,668,313) and JP-A-H09-015013 (corresponding to U.S. Pat. No. 5,681,989). Nevertheless, there is no description as to adjustment of the variation for each product in the output characteristics in the backflow region.

SUMMARY

According to the present disclosure, there is provided a method for adjusting a flow measuring device that includes a housing and a flow sensor. The housing includes a bypass flow passage which is formed to take in a part of a mainstream of air. The flow sensor is disposed in the bypass flow passage and configured to output an electrical signal in accordance with a flow rate of air. The bypass flow passage is formed in an asymmetrical shape with respect to the flow sensor in upstream and downstream directions of the mainstream. A flow from an upstream side toward a downstream side of the mainstream is a forward flow. A flow from the downstream side toward the upstream side of the mainstream is a backward flow. According to the method, an output from the flow sensor in a backward-flow region is obtained. Furthermore, the output of the flow sensor in the backward-flow region is adjusted to have a desired output characteristic.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

A flow measuring device of the following embodiments adjusts an output of a flow sensor in a backward-flow region (backflow region) to have a desired output characteristic, with a flow from an upstream side toward downstream side in a mainstream referred to as a forward flow, and with a flow from the downstream side toward upstream side in the mainstream referred to as a backward flow. Specifically, the output of the flow sensor in the backflow region that is obtained by disposing the flow measuring device inside a duct in which a pulsation is formed, is adjusted to have a desired output characteristic.

First Embodiment

Figure 1B:
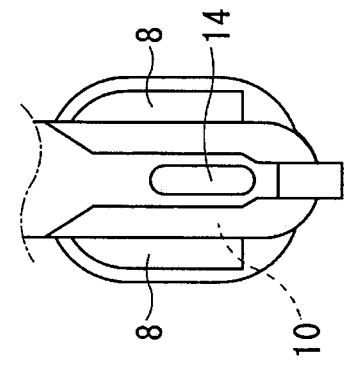
FIG. 1B is a diagram illustrating the flow measuring device of the first embodiment when viewed from a downstream side in a mainstream.
Figure 1A:
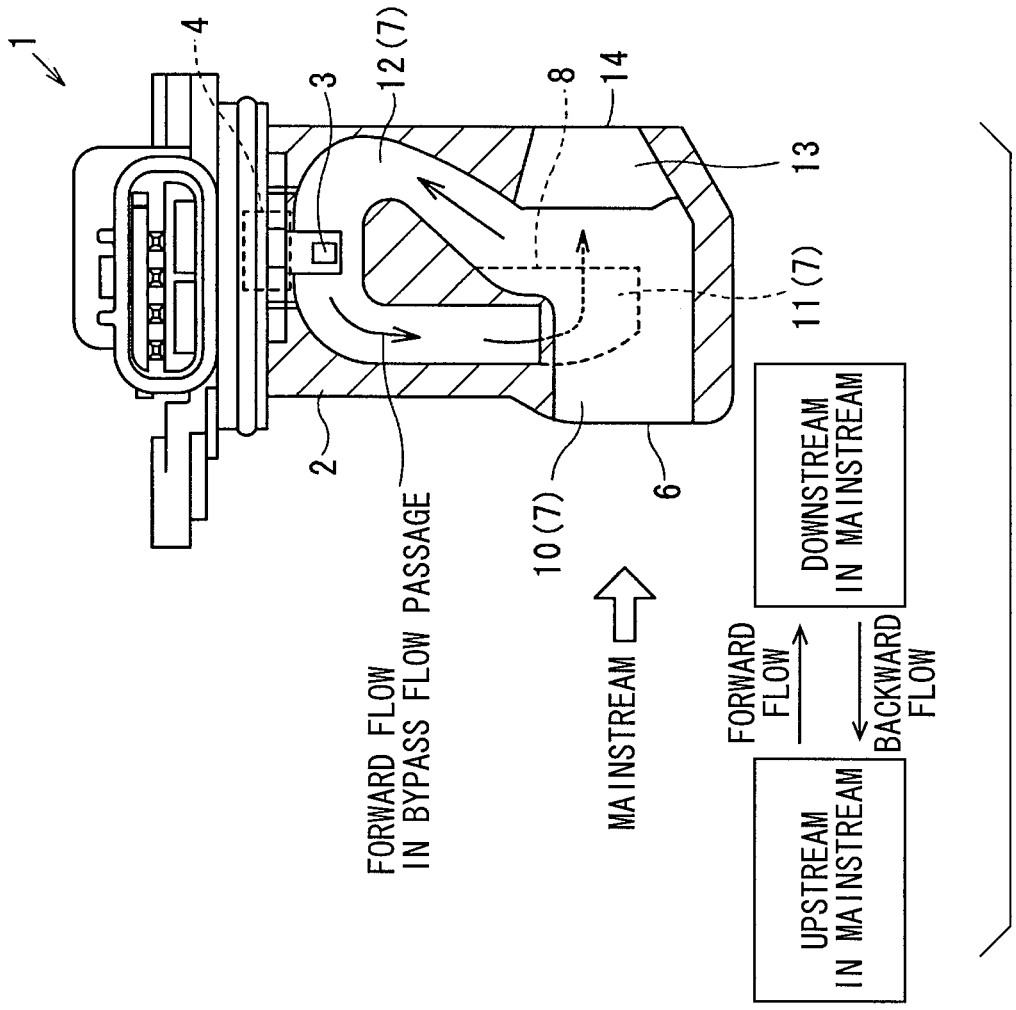
FIG. 1A is a sectional view illustrating inside of a flow measuring device in accordance with a first embodiment.
Figure 2:
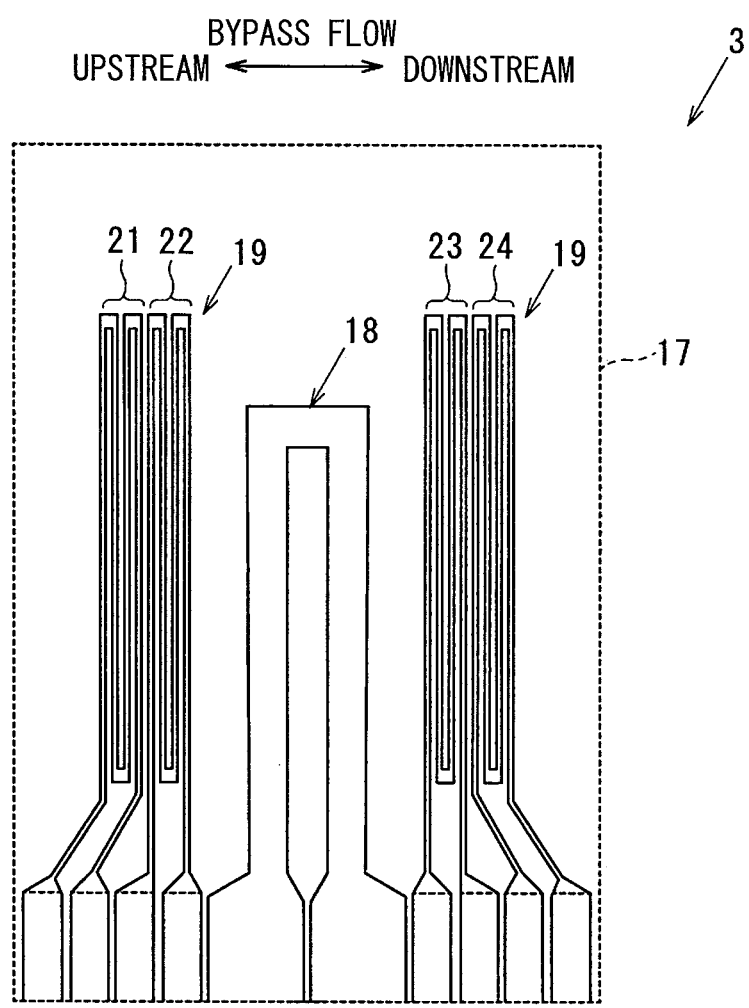
FIG. 2 is a diagram illustrating a main feature of a flow sensor according to the first embodiment.

A configuration of a flow measuring device 1 in accordance with a first embodiment will be described with reference to FIGS. 1A to 2. The flow measuring device 1 is, for example, an air flow meter for measuring the amount of air suctioned into an engine for an automobile, and used through its attachment to an intake passage toward the engine for the automobile. The flow measuring device 1 is constituted integrally of a housing 2, a flow sensor 3, a circuit chip 4 and so forth, which will be described in greater detail hereinafter.

The housing 2 opens toward an upstream side in a flow (mainstream) of air which flows through an intake passage. The housing 2 includes an air-taking port 6 which takes in a part of air flowing through the intake passage in a forward direction, an internal flow passage 7 through which the air taken in from the air-taking port 6 passes and which accommodates the flow sensor 3, and a discharge port 8 that opens toward a downstream side in the intake passage and that brings the air, which is taken in from the port 6 and which passes by the flow sensor 3, back to the intake passage. The flow sensor 3 generates a heat transfer phenomenon between the sensor 3 and the air taken in from the air-taking port 6, and produces an output value equivalent to a mass flow rate.

A flow direction of air in the internal flow passage 7 may be described as follows. With the air-taking port 6 being an upstream end and with the discharge port 8 being a downstream end, a flow from the air-taking port 6 to the discharge port 8 is referred to as a forward flow, and a flow from the discharge port 8 to the air-taking port 6 is referred to as a backward flow. Accordingly, while the forward flow (flow from the upstream side to downstream side in the mainstream) is being produced in the mainstream, air flows from the air-taking port 6 to the discharge port 8; and while the backward flow (flow from the downstream side to upstream side in the mainstream) is being produced in the mainstream, air flows from the discharge port 8 to the air-taking port 6.

The internal flow passage 7 includes, for example, an air-taking passage 10 formed continuously from the air-taking port 6 to the downstream side, a discharge passage 11 formed continuously from the discharge port 8 to the upstream side, and a circulation passage 12 which accommodates the flow sensor 3 and which is formed around to connect together the air-taking passage 10 and the discharge passage 11.

The air-taking passage 10 is formed to extend linearly from the air-taking port 6 to the downstream side, and the flow in the air-taking passage 10 is parallel to the forward flow in the mainstream. A dust discharge passage 13 for making dust contained in the air taken in from the air-taking port 6 flow straight and for discharging the dust, is connected to a downstream end of the air-taking passage 10. A dust discharge port 14 is formed at a downstream end of the dust discharge passage 13. A width of the dust discharge passage 13 tapers off toward the dust discharge port 14.

The circulation passage 12 is connected to the air-taking passage 10 and the discharge passage 11 generally in a C-shaped manner, for example. The air taken in from the air-taking port 6 flows around from the air-taking passage 10 toward the discharge passage 11 along the passage 12. The flow sensor 3 is accommodated in a part of the circulation passage 12 at which air flows in a direction opposite from the flow direction in the air-taking passage 10. Consequently, the circulation passage 12 is a bypass flow passage into which a part of the mainstream is taken, and a flow rate is detected by the flow sensor 3 disposed in this circulation passage 12. The circulation passage 12 has different passage shapes between on an upstream side and downstream side of the flow sensor 3, and the bypass flow passage is formed in an asymmetrically-shaped manner in upstream and downstream flow directions with respect to the flow sensor 3.

The circulation passage 12 branches to bend generally at a right angle from a linear passage composed of the air-taking passage 10 and the dust discharge passage 13 at the downstream end of the air-taking passage 10. Thus, the air-taking passage 10 branches at its downstream end between the circulation passage 12 and the dust discharge passage 13. The dust flows straight from the air-taking passage 10 to the dust discharge passage 13 due to inertia force to be discharged into the intake passage through the dust discharge port 14. The air flows into the circulation passage 12 with its flow direction changed from the air-taking passage 10 into the passage 12.

The discharge passage 11 is connected to a downstream end of the circulation passage 12. The passage 11 bends to rotate generally at a right angle from the downstream end of the circulation passage 12, and its discharge port 8 is formed at a downstream end of the bent part (see FIG. 1A). The discharge passage 11 branches into two parts from the upstream end so as to straddle the air-taking passage 10, and the discharge port 8 is formed at two positions on both sides of the air-taking passage 10 (see FIG. 1B). The discharge port 8 opens toward the downstream side in the mainstream.

The flow sensor 3 outputs an electrical signal (e.g., voltage signal) in accordance with a flow rate of air which flows through the circulation passage 12. Specifically, as illustrated in FIG. 2, the sensor 3 includes a heater element 18 and a temperature-sensitive element 19 made of thin film resistors on a membrane 17, which is disposed on a semiconductor substrate. These elements are connected to a circuit board (not shown) incorporated into the circuit chip 4.

The temperature-sensitive element 19 includes two resistance temperature detectors 21, 22 disposed on an upstream side of the heater element 18, and two resistance temperature detectors 23, 24 disposed on the downstream side of the heater element 18. The heater element 18 and the temperature-sensitive element 19 are electrically connected to the circuit board incorporated into the circuit chip 4. The elements 18, 19 output an electrical signal produced based on a temperature difference between the resistance temperature detectors 21, 22 and the resistance temperature detectors 23, 24 through an output circuit and an amplifying circuit disposed on the circuit board.

The circuit chip 4 includes a heating element control circuit for controlling the heater element 18 to be a set temperature, an output circuit for outputting a voltage in accordance with the flow rate, and an amplifying circuit for amplifying the output voltage from this output circuit. The amplifying circuit includes a writable memory, and is configured so that gain and offset can be written into the circuit.

The flow sensor 3 and the circuit chip 4 are integrally configured as a sensor assembly 25.

Figure 3:
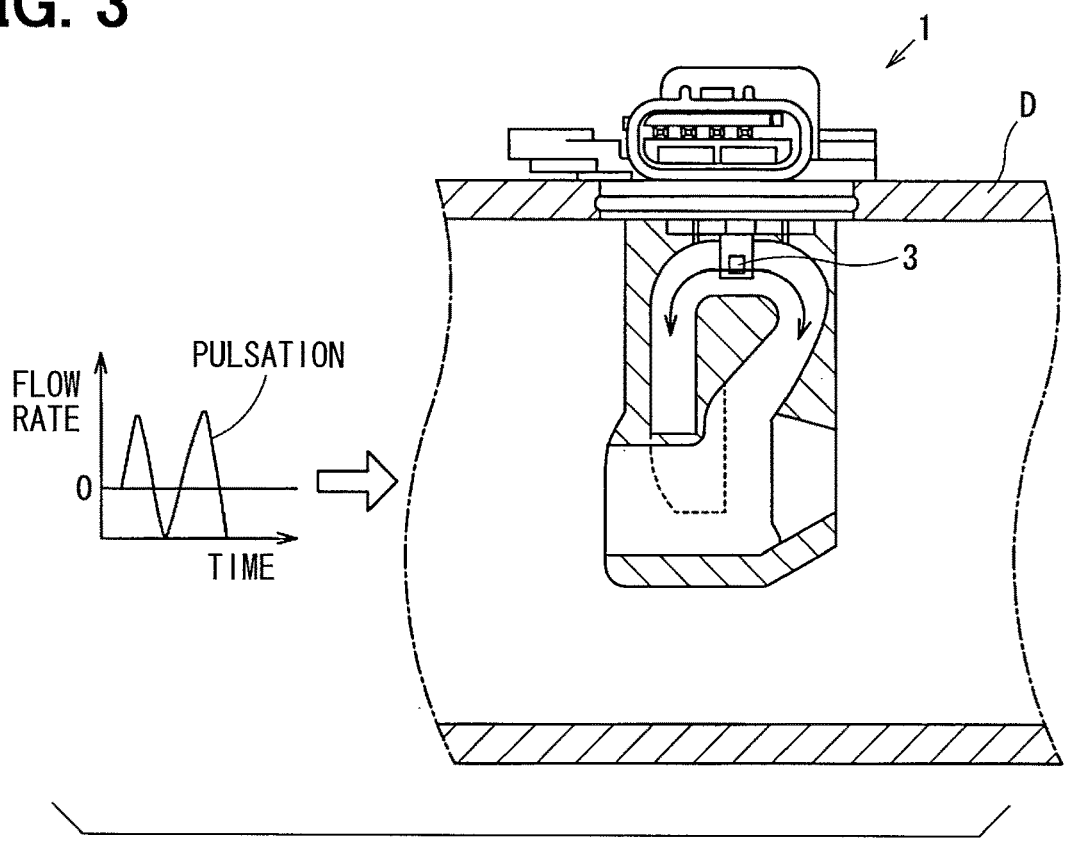
FIG. 3 is a diagram illustrating how to obtain output characteristics in a backflow region according to the first embodiment.

A method for adjusting the flow measuring device 1 of the first embodiment will be described with reference to FIGS. 3 and 4. In the present embodiment, the flow measuring device 1 is disposed inside a duct D in which pulsation is formed. By obtaining an output from the flow sensor 3, output characteristics (backflow characteristics) in a backward-flow region (backflow region) are gained.

More specifically, the flow measuring device 1 is disposed in the duct D and the pulsation is produced inside the duct D. As a result, the forward flow and backward flow are alternately repeated in the circulation passage 12. The backflow characteristic obtained from the output of the flow sensor 3 at this time is adjusted to be a desired output characteristic. The pulsation is created, for example, through attachment of a valve or engine to the duct D.

Figure 4:
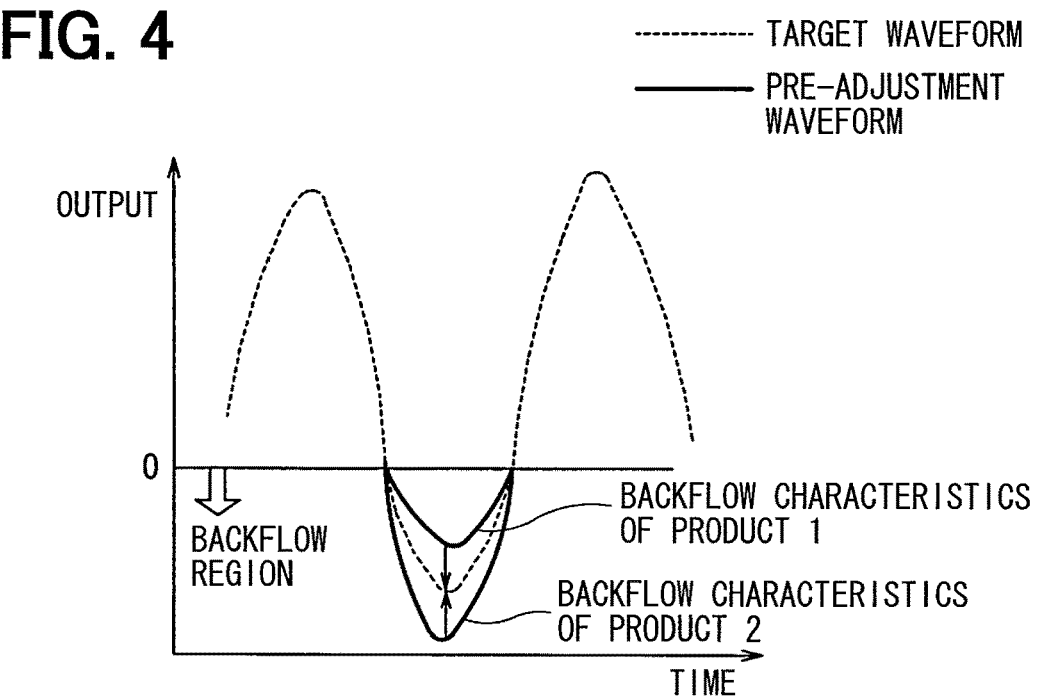
FIG. 4 is a diagram explaining output adjustment according to the first embodiment.
Figure 10:
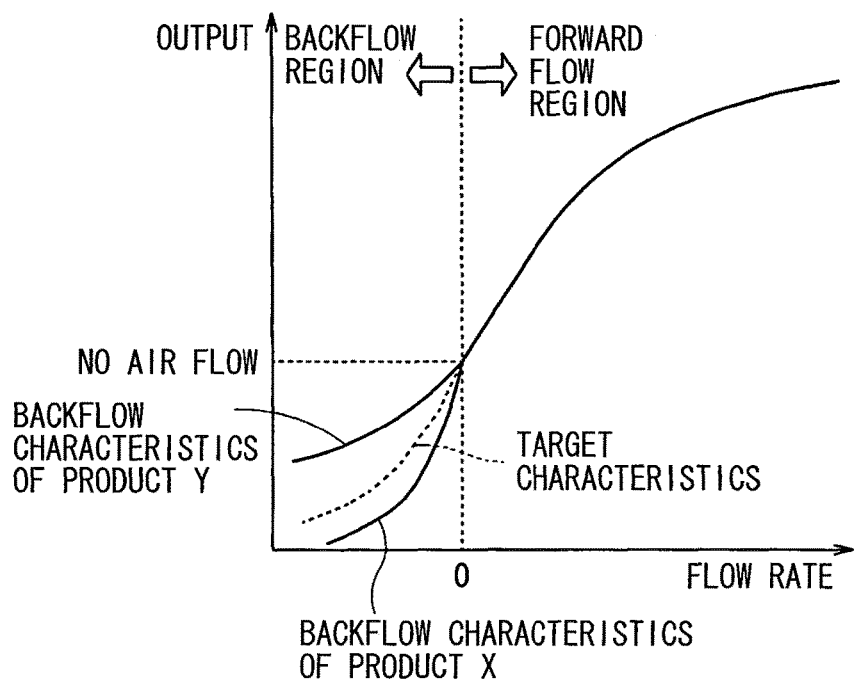
FIG. 10 is a diagram illustrating a variation in output characteristics in a backflow region in accordance with a conventional technology.

A flow sensor output obtained under this pulsation environment is illustrated in FIG. 4. The outputs in the backflow region vary between products, and a shift from a target waveform is made (see a backflow characteristic of a product 1 and a backflow characteristic of a product 2 in FIG. 4). Accordingly, the output in the backflow region is adjusted so as to conform with the target waveform. In addition, the target waveform indicates output characteristic (target characteristic (desired output characteristic) in FIG. 10) that is applicable to a conversion map (conversion characteristics that convert the electric signal output from the flow sensor 3 into a flow rate) stored in the ECU.

The output adjustment is made by a known method. For example, the gain and offset, which are written into the memory of the amplifying circuit, are rewritten by a signal from the outside, and the output is adjusted based on these gain and offset.

Operation and effects of the first embodiment will be described below. In the first embodiment, the output of the flow sensor 3 in the backflow region is adjusted to have a desired output characteristic. Accordingly, the variation of the backflow characteristics among the products can be adjusted. Therefore, even in the backflow region, a conversion from the electrical signal to the flow rate can be made through a single conversion map without regard to this variation for each product.

In the present embodiment, the backflow characteristic of the flow sensor 3 obtained when the flow measuring device 1 is disposed under the pulsation environment, is adjusted to be a desired output characteristic (target characteristic). In the adjustment of the output of the flow measuring device 1, the output characteristic that approximates the output characteristic in an actual usage state may be replicated, and this output characteristic may be adjusted to be a desired output characteristic.

The backward flow generated in the circulation passage 12 at the time of use of the flow measuring device 1 with the device 1 disposed in a vehicle, is momentary. More specifically, due to the influence of drive of the engine, the pulsation is caused in the mainstream, and a dynamic backward flow is produced in the circulation passage 12 because of this pulsation. Consequently, in the present embodiment, as the output characteristic that is close to the output characteristic at the time of use of the flow measuring device, the output characteristic of the backflow region obtained from the output of the flow sensor 3 in a pulsation generation state is adjusted to be a desired output characteristic. As a result, accuracy in flow measurement in the backflow region is improved.

Second Embodiment

Figure 5:
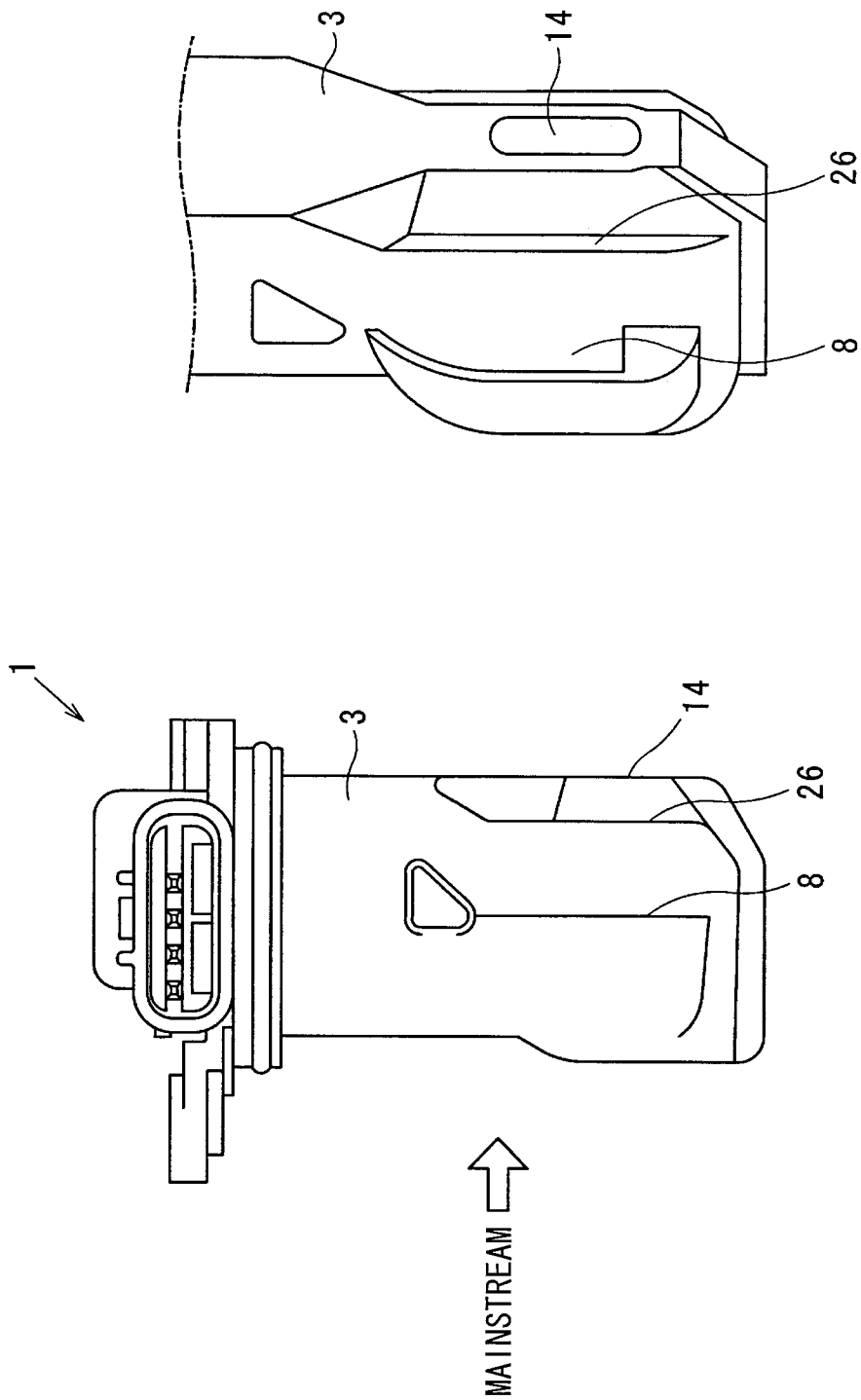
FIG. 5A is a side view illustrating a flow measuring device in accordance with a second embodiment.
FIG. 5B is a partial perspective view illustrating the flow measuring device of the second embodiment.
Figure 6:
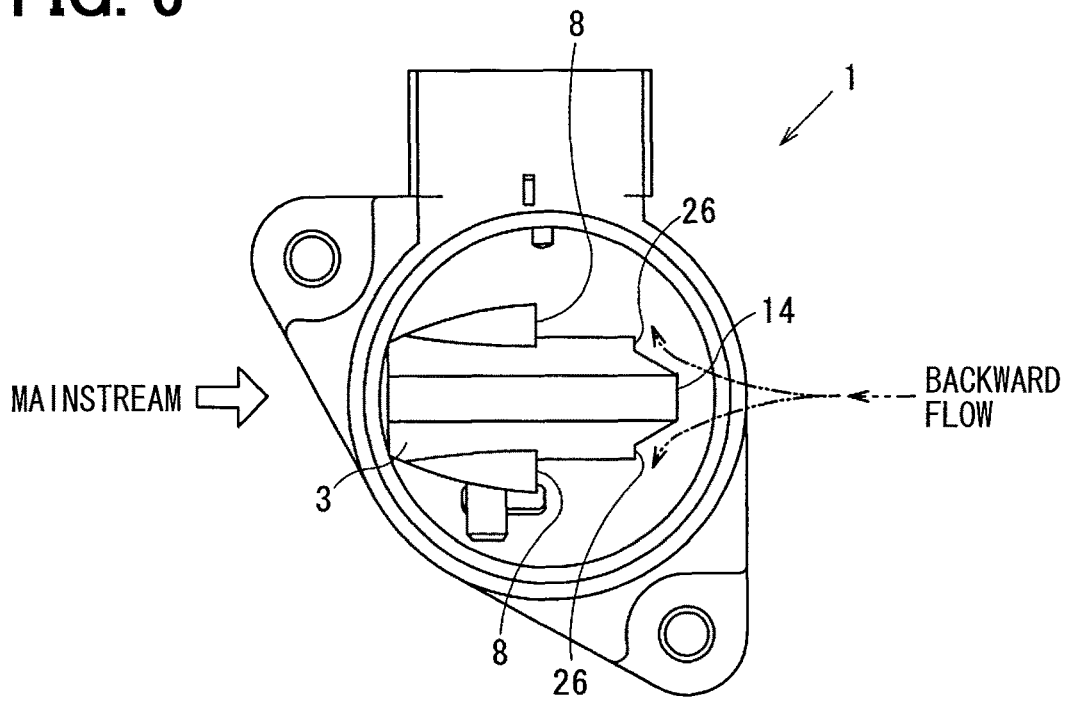
FIG. 6 is a bottom view illustrating the flow measuring device of the second embodiment.

Configuration of a flow measuring device of a second embodiment will be described with a focus on the respects different from the first embodiment in reference to FIGS. 5A to 6. The flow measuring device of the second embodiment includes a backflow prevention structure that prevents the entry of the backward flow from an outlet of a bypass flow passage when the backward flow is generated in a mainstream.

For example, in the present embodiment, a level difference 26, which is formed on an outer peripheral surface of a housing 2, is provided near the outlet of the bypass flow passage and on a downstream side of the outlet of the bypass flow passage, i.e., between a dust discharge port 14 and a discharge ports 8 in a mainstream direction. The level differences 26 are formed on both side surfaces of the housing 2 in its width direction. For example, the level difference 26 includes a planar portion that is perpendicular to the mainstream direction and faces the downstream side in the mainstream. A position and size of this level difference 26 are set to produce such a streamline as to avoid a discharge port 8 when the backward flow is generated in the mainstream (see FIG. 6). Accordingly, the backward flow does not easily enter from the discharge port 8, and the backward flow thereby does not easily reach a flow sensor 3.

An adjustment method in accordance with the second embodiment will be described in reference to FIGS. 5A to 7. In the present embodiment, since the backward flow does not easily enter through the discharge port 8, backflow characteristics are not easily obtained by the flow sensor 3 by the method whereby the flow measuring device 1 is disposed under the pulsation environment as in the first embodiment. Consequently, in the present embodiment, before disposing the flow sensor 3 in the housing 2, the flow sensor 3 is disposed in the pulsation environment to obtain the backflow characteristic based on an output of the flow sensor 3. Then, similar to the first embodiment, output adjustment is performed on the obtained backflow characteristic.

Figure 7:
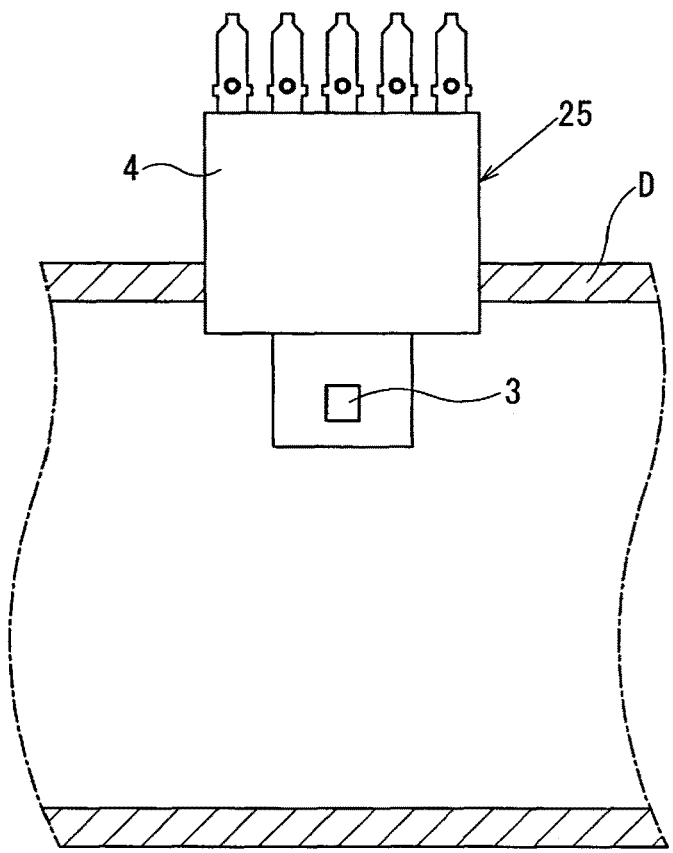
FIG. 7 is a diagram illustrating how to obtain output characteristics in a backflow region according to the second embodiment.

Thus, only a sensor assembly 25 having the flow sensor 3 is taken out from the housing 2, and disposed in the pulsation environment (see FIG. 7).

Moreover, instead of under the pulsation environment, the sensor assembly 25 may be placed under a static backflow environment to obtain backflow characteristics. The backflow environment that should be replicated at this time is a backward flow produced at the periphery of the flow sensor 3 in a circulation passage 12 when the backward flow is generated in the mainstream.

Third Embodiment

Figure 8:
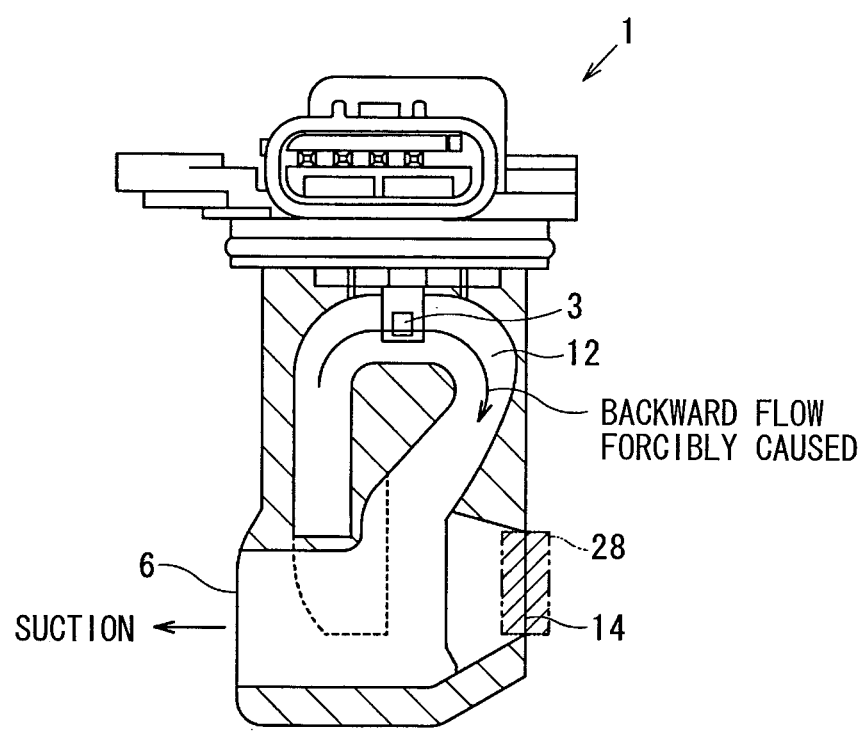
FIG. 8 is a diagram illustrating how to obtain output characteristics in a backflow region in accordance with a third embodiment.

An adjustment method in accordance with a third embodiment will be described in reference to FIG. 8 with a focus on the respects different from the second embodiment. A flow measuring device 1 of the third embodiment is configured similar to the second embodiment, and includes a backflow prevention structure.

In the present embodiment, a similar flow to a case where a backward flow is caused forcibly in a mainstream inside a circulation passage 12 is formed, and an output of a flow sensor 3 at this time is treated as a backflow characteristic, on which output adjustment is performed. Specifically, a dust discharge port 14 is closed by a cap 28 or the like, and the backward flow is generated forcibly in the circulation passage 12 by suctioning air through an air-taking port 6.

Fourth Embodiment

Figure 9:
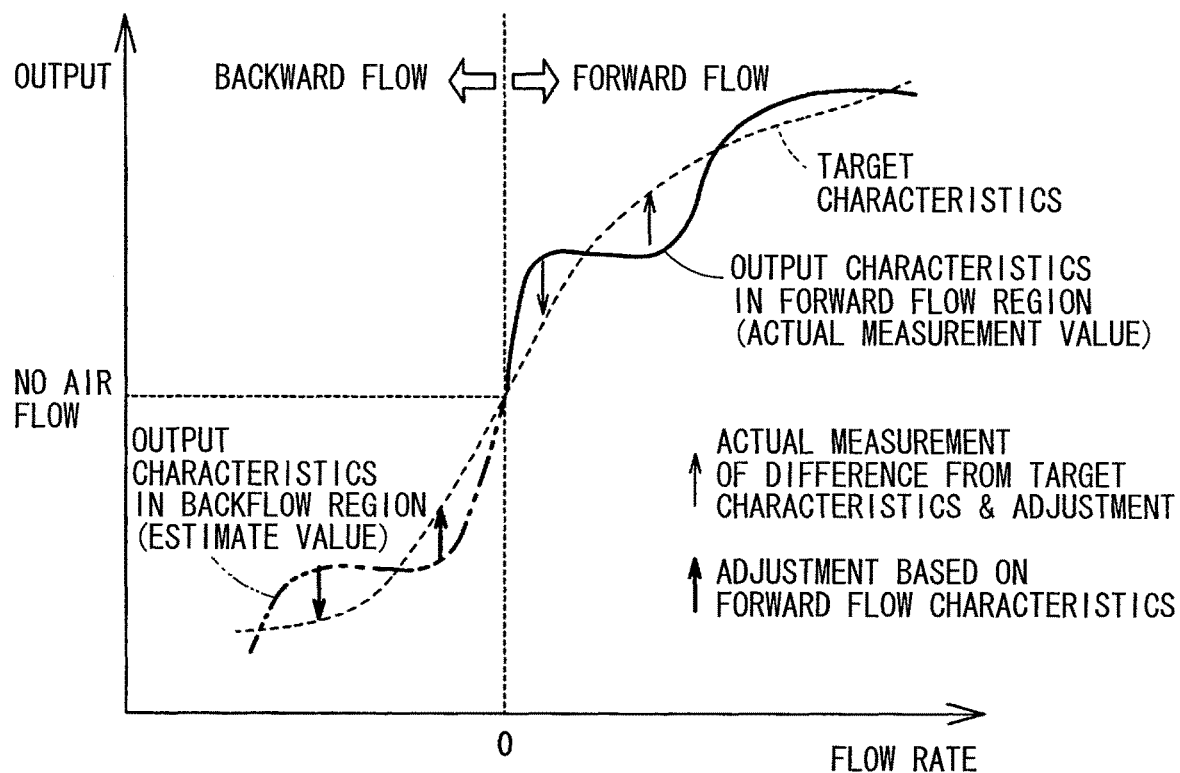
FIG. 9 is a diagram illustrating how to obtain output characteristics in a backflow region according to a fourth embodiment.

An adjustment method in accordance with a fourth embodiment will be described in reference to FIG. 9 with a focus on the respects different from the first embodiment. In the present embodiment, an output characteristic in a backflow region (backflow characteristic) is estimated based on an output from a flow sensor in a forward-flow region, and the estimated backflow characteristic is adjusted to be a desired output characteristic (target characteristic).

For example, the output characteristic of the backflow region is estimated to have an inclination similar to an output characteristic in the forward-flow region at a flow rate having the same absolute value. More specifically, as illustrated in FIG. 9, it is estimated that the output characteristic of the forward-flow region and the backflow characteristic are symmetrical about a flow rate 0 (zero).

Accordingly, the output adjustment of the backflow characteristic can be carried out without actual measurement of the backflow characteristic.

Modifications of the above embodiments will be described. In the second embodiment, there is employed such a structure that the backward flow does not easily enter through the discharge port 8 by the level difference 26. However, the entry of the backward flow may be prevented by providing such a structure that an outlet aperture plane of the bypass flow passage (opening surface of the discharge port 8) cannot be seen when the upstream side is viewed from the downstream side in the mainstream. For example, there may be formed such a structure that the backward flow does not easily enter through the discharge port 8 by providing the discharge port 8 to open in a direction that is perpendicular to the flow direction of the mainstream (e.g., width direction).

In the first embodiment, although the bypass flow passage which takes in a part of the mainstream is provided by the circulation passage 12, the mode of the bypass flow passage is not limited to this configuration. For example, as described in FIG. 7 of JP-A-H09-015013, such a bypass flow passage that the forward flow in the bypass flow passage is in the same direction as as the forward flow in the mainstream may be employed.

In the first embodiment, the ECU includes the conversion map. Alternatively, there may be employed a mode in which the conversion map is included in the circuit chip 4 of the flow measuring device 1 and the flow rate signal is transmitted to the ECU.

In addition, the backflow characteristic may be divided between a small flow rate region and large flow rate region, and output adjustment of the small flow rate region and output adjustment in the large flow rate region may be separately performed. Thus, a gain and offset may be set separately in the small flow rate region and large flow rate region to carry out the output adjustment. Moreover, instead of the two divisions of the small flow rate region and large flow rate region, by further subdividing the flow rate region, output adjustment may be performed for each flow rate region.

To sum up, the method for adjusting the flow measuring device 1 of the above embodiments can be described as follows.

A method is for adjusting a flow measuring device 1 that includes a housing 2 and a flow sensor 3. The housing 2 includes a bypass flow passage 12 which is formed to take in a part of a mainstream of air. The flow sensor 3 is disposed in the bypass flow passage 12 and configured to output an electrical signal in accordance with a flow rate of air. The bypass flow passage 12 is formed in an asymmetrical shape with respect to the flow sensor 3 in upstream and downstream directions of the mainstream. A flow from an upstream side toward a downstream side of the mainstream is a forward flow. A flow from the downstream side toward the upstream side of the mainstream is a backward flow. According to the method, an output from the flow sensor 3 in a backward-flow region is obtained. Furthermore, the output of the flow sensor 3 in the backward-flow region is adjusted to have a desired output characteristic. Accordingly, the variation of the output characteristic of the backflow region among the products can be adjusted. Therefore, even in the backflow region, a conversion from the electrical signal to the flow rate can be made through a single conversion map without regard to this variation for each product.

When obtaining the output from the flow sensor 3 in the backward-flow region, an output from the flow sensor 3 in a pulsation-generating state may be obtained. In the adjustment of the output of the flow measuring device 1, the output characteristic that approximates the output characteristic in an actual usage state may be replicated, and this output characteristic may be adjusted to be a desired output characteristic.

The backward flow generated in the bypass flow passage 12 at the time of use of the flow measuring device 1 is momentary. More specifically, due to the influence of drive of the engine, the pulsation is caused in the mainstream, and a dynamic backward flow is produced in the bypass flow passage 12 because of this pulsation. Accordingly, as the output characteristic that is close to the output characteristic at the time of use of the flow measuring device 1, the output characteristic of the backflow region obtained from the output of the flow sensor 3 in a pulsation generation state is adjusted to be a desired output characteristic.

To obtain the output from the flow sensor 3 in the backward-flow region, the housing 2 may be provided with a backflow prevention structure that is configured to prevent entry of the backward flow through an outlet 8 of the bypass flow passage 12 when the backward flow is generated in the mainstream. Furthermore, an output from the flow sensor 3 in a pulsation-generating state may be obtained. Accordingly, the output characteristic of the backflow region is adjusted to be a desired output characteristic. Even though there is the backflow prevention structure, as the output characteristic that is close to the output characteristic at the time of use of the flow measuring device 1, the output characteristic of the backflow region obtained from the output of the flow sensor 3 in a pulsation generation state is adjusted to be a desired output characteristic.

According to the method for adjusting the flow measuring device 1, the flow measuring device 1 includes the backflow prevention structure that prevents the entry of the backward flow from the outlet of the bypass flow passage 12 when the backward flow is generated in the mainstream. As a method of facilitating the acquisition of the backflow characteristic of the flow sensor 3 even though there is the backflow prevention structure, the backflow characteristic is obtained by disposing the flow sensor 3 in a state before the sensor 3 is disposed in the housing 2, in the pulsation environment. Consequently, the output of the flow sensor 3 in the backflow region, which is obtained by disposing the flow sensor 3 in a state before the sensor 3 is disposed in the housing 2, under the pulsation environment, is adjusted to have a desired output characteristic.

According to the method for adjusting the flow measuring device 1, the flow measuring device 1 includes the backflow prevention structure that prevents the entry of the backward flow from the outlet 8 of the bypass flow passage 12 when the backward flow is generated in the mainstream. Even though there is the backflow prevention structure, as the method of facilitating the acquisition of the backflow characteristic of the flow sensor 3, the backflow characteristic is obtained by forming a similar flow to a case where a backward flow is caused forcibly in a mainstream inside the bypass flow passage 12. Therefore, the output of the flow sensor 3 in the backflow region obtained by forming a similar flow to the case where the backward flow is caused forcibly in the mainstream inside the bypass flow passage 12 is adjusted to have a desired output characteristic.

To provide the housing 2 with the backflow prevention structure, the outlet 8 of the bypass flow passage 12 may be formed such that an opening surface of the outlet 8 is unseeable when the upstream side is viewed from the downstream side in the mainstream. This illustrates an example of the backflow prevention structure, and produces operation and effects similar to the above-described backflow prevention structures. In addition, to provide the housing 2 with the backflow prevention structure, the housing 2 may be provided with a planar portion 26. The planar portion 26 is located near the outlet 8 of the bypass flow passage 12 and on the downstream side of the outlet 8 in a direction of the mainstream. The planar portion 26 is generally perpendicular to the direction of the mainstream and faces the downstream side of the mainstream. This illustrates an example of the backflow prevention structure, and produces operation and effects similar to the above-described backflow prevention structures.

To obtain the output from the flow sensor 3 in the backward-flow region, an output from the flow sensor 3 may be estimated based on an output from the flow sensor 3 in a forward-flow region. Thus, for example, on the assumption that an output characteristic similar to the output characteristic in the forward-flow region will be exhibited also in the backflow region, the output characteristic in the backflow region is estimated based on the output characteristic in the forward-flow region. The output characteristic in this estimated backflow region is adjusted to be a desired output characteristic. As a result, without flow measurement in the backflow region, the output characteristic of the backflow region can be adjusted based on the output characteristic of the forward-flow region.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A method for adjusting a plurality of flow measurement devices, wherein each flow measurement device includes:
   a housing including a bypass flow passage which is formed to take in part of a mainstream of air;
   a flow sensor disposed in the bypass flow passage and configured to output an electrical signal in accordance with a flow rate of air; and
   a writable memory, wherein:
   the bypass flow passage is formed in an asymmetrical shape with respect to the flow sensor in upstream and downstream directions of the mainstream;
   a flow from an upstream side toward a downstream side of the mainstream is a forward flow; and
   a flow from the downstream side toward the upstream side of the mainstream is a backward flow,
   the method comprising:
   obtaining an output in a backward-flow direction from the flow sensor in each of the flow measurement devices;
   storing the output of the flow sensor in the writable memory of the flow measuring device in each of the flow measurement devices;
   adjusting, by using a respective adjustment value stored in the writable memory of each flow measurement device, the output of each flow sensor in the backward-flow region to an adjusted output conforming to a target output on the backward-flow side, such that the flow measurement devices output the same adjusted output corresponding to a specific flow rate in the backward-flow region, wherein the adjusted output is applicable to a single conversion map that is to convert the adjusted output into a flow rate by a respective electronic control unit (ECU) and is stored in each respective ECU, wherein each ECU is provided separately from each of the flow measurement devices; and
   storing the adjusted output in the writable memory of each flow measurement device,
   wherein the method is implemented to reduce variation in the output of each flow measurement device with respect to each other.

2. The method according to claim 1, wherein, for each flow measurement device, the obtaining of the output from the flow sensor in the backward-flow region includes obtaining an output from the flow sensor in a pulsation-generating state.

3. The method according to claim 1, wherein, for each flow measurement device, the obtaining of the output from the flow sensor in the backward-flow region includes:
   providing the housing with a backflow prevention structure that is configured to prevent entry of the backward flow through an outlet of the bypass flow passage when the backward flow is generated in the mainstream; and
   obtaining an output from the flow sensor in a pulsation-generating state.

4. The method according to claim 3, wherein, for each flow measurement device, the providing of the housing with the backflow prevention structure includes forming the outlet of the bypass flow passage such that an opening surface of the outlet is unseeable when the upstream side is viewed from the downstream side in the mainstream.

5. The method according to claim 3, wherein, for each flow measurement device:
   the providing of the housing with the backflow prevention structure includes providing the housing with a planar portion;
   the planar portion is located near the outlet of the bypass flow passage and on the downstream side of the outlet in a direction of the mainstream; and
   the planar portion is generally perpendicular to the direction of the mainstream and faces the downstream side of the mainstream.

6. The method according to claim 1, wherein, for each flow measurement device, the obtaining of the output from the flow sensor in the backward-flow region includes:
   providing the housing with a backflow prevention structure that is configured to prevent entry of the backward flow through an outlet of the bypass flow passage when the backward flow is generated in the mainstream;
   disposing the flow sensor in a pulsation environment before the flow sensor is placed in the housing; and
   obtaining an output from the flow sensor in the pulsation environment.

7. The method according to claim 6, wherein, for each flow measurement device, the providing of the housing with the backflow prevention structure includes forming the outlet of the bypass flow passage such that an opening surface of the outlet is unseeable when the upstream side is viewed from the downstream side in the mainstream.

8. The method according to claim 6, wherein, for each flow measurement device:
   the providing of the housing with the backflow prevention structure includes providing the housing with a planar portion;

the planar portion is located near the outlet of the bypass flow passage and on the downstream side of the outlet in a direction of the mainstream; and the planar portion is generally perpendicular to the direction of the mainstream and faces the downstream side of the mainstream.

9. The method according to claim 1, wherein, for each flow measurement device, the obtaining of the output from the flow sensor in the backward-flow region includes:

providing the housing with a backflow prevention structure that is configured to prevent entry of the backward flow through an outlet of the bypass flow passage when the backward flow is generated in the mainstream;

forcibly forming a flow, which is similar to the backward flow produced in the mainstream, in the bypass flow passage; and obtaining an output from the flow sensor in the forcibly-formed flow.

10. The method according to claim 9, wherein the providing of the housing with the backflow prevention structure includes forming the outlet of the bypass flow passage such that an opening surface of the outlet is unseeable when the upstream side is viewed from the downstream side in the mainstream.

11. The method according to claim 9, wherein:

the providing of the housing with the backflow prevention structure includes providing the housing with a planar portion;

the planar portion is located near the outlet of the bypass flow passage and on the downstream side of the outlet in a direction of the mainstream; and the planar portion is generally perpendicular to the direction of the mainstream and faces the downstream side of the mainstream.

12. The method according to claim 1, wherein, for each flow measurement device, the obtaining of the output from the flow sensor in the backward-flow region includes estimating an output from the flow sensor based on an output from the flow sensor in a forward-flow region.

* * * * *